US012269259B1

(12) United States Patent
Koch et al.

(10) Patent No.: US 12,269,259 B1
(45) Date of Patent: Apr. 8, 2025

(54) MACHINE ASSEMBLY FOR CONVEYING SHEET-FORMAT SUBSTRATES, COMPRISING A FIRST BELT CONVEYOR AND A SECOND BELT CONVEYOR, AND A PRINTING MACHINE COMPRISING SAID MACHINE ASSEMBLY

(71) Applicant: KOENIG & BAUER AG, Würzburg (DE)

(72) Inventors: Heinz Michael Koch, Dresden-Cossebaude (DE); Philipp Hoyer, Dresden (DE); Volker Kessler, Dresden (DE); Annemarie Koch, Dresden (DE); Stefan Quentin, Klipphansen (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/854,991

(22) PCT Filed: Oct. 18, 2023

(86) PCT No.: PCT/EP2023/079003

§ 371 (c)(1),
(2) Date: Oct. 8, 2024

(87) PCT Pub. No.: WO2024/165194

PCT Pub. Date: Aug. 15, 2024

(30) Foreign Application Priority Data

Feb. 8, 2023 (DE) ..................... 10 2023 103 065.5

(51) Int. Cl.
*B41J 11/00* (2006.01)
*B41J 13/08* (2006.01)
(Continued)

(52) U.S. Cl.
CPC .......... *B41J 11/007* (2013.01); *B41J 11/0085* (2013.01); *B41J 13/08* (2013.01);
(Continued)

(58) Field of Classification Search
CPC ............................. B41J 11/007; B41J 11/0085
See application file for complete search history.

(56) References Cited

U.S. PATENT DOCUMENTS

2005/0061627 A1 * 3/2005 Muller .................. B65H 29/66 198/689.1

FOREIGN PATENT DOCUMENTS

DE 102016207397 A1 11/2017
DE 102019208156 A1 1/2020
(Continued)

OTHER PUBLICATIONS

International Search Report of PCT/EP2023/079003 dated Jan. 26, 2024.

*Primary Examiner* — Sharon Polk
(74) *Attorney, Agent, or Firm* — MATTINGLY & MALUR, PC

(57) ABSTRACT

Examples include a machine assembly for conveying sheet-format substrates, including a first belt conveyor and a second belt conveyor. These belt conveyors each have a continuously circulating transport belt and are arranged one after another in the transport direction of the substrates conveyed on the respective transport belt. The substrate to be transferred from the first belt conveyor to the second belt conveyor is lifted off the transport belt of the first belt conveyor by means of an air current generated by a lifting nozzle and an opposing air current generated by a counter-nozzle. The substrate to be transferred remains fixed until its transfer by the vacuum pressure generated by a suction chamber of the first belt conveyor. This suction chamber
(Continued)

fixing the substrate is arranged close to the lifting region. Examples also relate to a printing machine comprising this machine assembly.

13 Claims, 3 Drawing Sheets

(51) Int. Cl.
*B65H 29/24* (2006.01)
*B65H 29/52* (2006.01)

(52) U.S. Cl.
CPC ........... *B65H 29/242* (2013.01); *B65H 29/52* (2013.01); *B65H 2301/4461* (2013.01); *B65H 2301/44735* (2013.01); *B65H 2404/2691* (2013.01); *B65H 2406/122* (2013.01); *B65H 2406/364* (2013.01)

(56) References Cited

FOREIGN PATENT DOCUMENTS

| | | | | | |
|---|---|---|---|---|---|
| DE | 102021118468 | B3 | | 8/2022 | |
| DE | 102021006551 | A1 | | 1/2023 | |
| DK | 146649 | B | * | 11/1983 | ............. B65H 29/60 |
| EP | 3025867 | A1 | | 6/2016 | |
| JP | 55-135024 | A | | 10/1980 | |
| JP | 2006-036471 | A | | 2/2006 | |
| JP | 2013-040007 | A | | 2/2013 | |
| WO | 2013/160399 | A1 | | 10/2013 | |
| WO | WO-2016174224 | A1 | * | 11/2016 | .............. B41F 13/54 |

* cited by examiner

MACHINE ASSEMBLY FOR CONVEYING SHEET-FORMAT SUBSTRATES, COMPRISING A FIRST BELT CONVEYOR AND A SECOND BELT CONVEYOR, AND A PRINTING MACHINE COMPRISING SAID MACHINE ASSEMBLY

CROSS-REFERENCES TO RELATED APPLICATIONS

This application is the US national phase, under 35 USC § 371, of PCT/EP2023/079003, filed on Oct. 18, 2023, published as WO 2024/165194 A1 on Aug. 15, 2024, and claiming priority to DE 10 2023 103 065.5, filed Feb. 8, 2023, and all of which are expressly incorporated by reference herein in their entireties.

TECHNICAL FIELD

Examples herein relate to a machine assembly for conveying sheet-format substrates, and to a printing machine comprising this machine assembly. In some examples, the machine assembly for conveying sheet-format substrates includes a first belt conveyor and a second belt conveyor. These belt conveyors each have a continuously circulating transport belt and are arranged one after the other in the transport direction of the substrates conveyed on the respective transport belt. The transport belt of the first belt conveyor and the transport belt of the second belt conveyor are arranged in the same transport plane extending rectilinearly in the transport direction of the substrates. The transport belt of the first belt conveyor is diverted by at least 90° in relation to the transport plane at the rear end thereof, in the transport direction of the substrates, at a diverting roller and the transport belt of the second belt conveyor likewise is diverted by at least 90° in relation to the transport plane, in the same direction as the transport belt of the first belt conveyor, at the forward end thereof, in the transport direction of the substrates, at a diverting roller, which is arranged spaced a first distance apart from the diverting roller of the first belt conveyor. In a region between the diverting roller of the first belt conveyor and the diverting roller of the second belt conveyor, the transport plane has a discontinuity point in the mechanical support of the substrates to be transported. A guide device, which extends transversely to the transport direction of the substrates and guides the substrates to be transported and comprises at least one lifting nozzle, is arranged in this region of the discontinuity point between the diverting roller of the first belt conveyor and the diverting roller of the second belt conveyor. The guide device comprises a tapered profile element, which extends transversely to the transport direction of the substrates. The at least one lifting nozzle of the guide device is arranged so as to open into the tip of the profile element. The tip of this profile element is oriented counter to the transport direction of the substrates toward the transport belt of the first belt conveyor and is arranged so as to be spaced apart by a first gap from the transport belt that is diverted at the diverting roller of the first belt conveyor. At least the transport belt of the first belt conveyor is designed as a suction belt that non-positively holds the relevant substrate resting thereon with the bearing surface thereof. The suction force is achieved by a negative pressure that is set in relation to the ambient barometric air pressure by means of a suction device. The suction device implementing the suction force at the suction belt of the first belt conveyor includes at least one suction chamber.

BACKGROUND

A sheet transport assembly for transporting a sheet along a process unit is known from EP 3 025 867 A1, wherein the process unit is configured to apply a process to a sheet, the sheet transport assembly comprising the following:

- a conveying unit comprising a transport belt and a diverting element, the transport belt being designed to transport the sheet in a transport direction along the process unit to the diverting element, the sheet being deposited with a contact side on the transport belt and with a process side towards the process unit, the diverting element being arranged in contact with the transport belt in order to deflect the transport belt downstream in the transport direction relative to the process unit; and
- a separating unit for separating the sheet from the transport belt, the separating unit being connected to an air supply source and comprising a restrain blowing device arranged for directing a restrain air current onto the process side of the sheet in a restrain area for urging the sheet towards the transport belt proximate to the diverting element and comprising a lifting blowing device arranged for directing a lifting air current onto the contact side of the sheet in a lifting region for lifting the sheet from the transport belt; the lifting region being arranged so as to extend only over a middle portion of a width of the sheet; and the width being a dimension of the sheet in a lateral direction perpendicular to the transport direction.

A conveyor is known from JP 2013-040007 A, which is capable of smoothly performing the transfer of workpieces between conveyor units, the conveyor comprising a plurality of conveyor units; a belt being stretched so as to be laid between at least two rollers positioned away from one another; and a rotation of the belt achieved by the rollers being driven causing suction to be applied to the workpieces on the surface of the belt and for these to be conveyed lying flat. The conveyor includes a scraper, which is provided on the downstream side of the conveyor unit for scraping the workpieces off the surface of the belt, and an air jetting part, which is provided in front of the downstream roller of the conveyor unit for blowing air to the bottom surfaces of the workpieces from the back side of the belt.

JP 2006036471 A relates to a solution for preventing front and rear end parts of a substrate that is transported from a device on the feeding side to a device on the receiving side in a bent state from coming into contact with a counterpart device.

JP S55-135024 A relates to a conveyor in which air is injected against the bridge between two conveyor belts or in which a floating system is provided for applying suction to the material, in order to ensure secure conveying, without the material getting caught between the conveyor belts.

A printing machine is known from DE 10 2019 208 156 A1, comprising a first conveyor belt and a downstream, second conveyor belt for transporting sheets and, arranged therebetween, a guide element for the sheets, wherein a blower device is present for lifting a leading edge of the respective sheet in the region of the transition from the first conveyor belt to the guide device. The blower device preferably arranged upstream from the guide element, as viewed in the transport direction of the sheets, and within a path of revolution of the first conveyor belt, wherein the first conveyor belt has a perforation, for example, and the blower device blows onto the respective sheet through the perforation.

A machine assembly comprising multiple processing stations processing sheets is known from DE 10 2021 118 468 B3, these processing stations being arranged one behind the other in the transport direction of the sheets; at least one of these processing stations comprising a first transport device that transports the sheets along a linear transport section and comprises at least one continuously circulating transport belt that is diverted at a diverting roller; this first transport device being designed so as to transport individual sheets that follow one another in a sequence lying flat in each case on its at least one transport belt; a second transport device transporting the sheets lying flat along a linear transport section, likewise on at least one continuously circulating transport belt, being arranged downstream from this processing station comprising the first transport device; a respective discontinuity point in the mechanical support of these sheets to be transferred in each case being formed at the point at which the sheets to be transported are transferred from the transport belt of the first transport device to the transport belt of the second transport device following in the transport direction of the sheets, in a conveying plane of these sheets to be transported; the diverting roller diverting the at least one transport belt of the first transport device being arranged at the discontinuity point in the mechanical support of the sheets to be transferred; a guide device, which extends transversely to the transport direction of the sheets and comprises a tapered profile element, being arranged at this discontinuity point; the tip of this profile element being oriented toward the transport belt of the first transport device counter to the transport direction of the sheets; at least one lifting nozzle being arranged in the profile element; and the relevant lifting nozzle being designed to open in the direction of the tip of this profile element.

SUMMARY

It is an object of some examples herein to provide a machine assembly for conveying sheet-format substrates and a printing machine comprising this machine assembly, wherein a transfer of the substrate which is devoid of disruptions from a first belt conveyor to a downstream second belt conveyor is ensured both in the case of a high transport speed of several thousand substrates per hour, for example in a range between 5,000 and 10,000 substrates per hour, and in the case of substrates having small formats, that is, in particular having a short edge length of, for example, less than 300 mm in the transport direction of these substrates to be transported.

The object is achieved by the machine assembly discussed above, and in which a wall of a last suction chamber, in the transport direction of the substrates, of the suction device is arranged spaced a second distance apart from the diverting roller of the first belt conveyor in the transport direction of the substrates directly upstream from this diverting roller. The wall of the last suction chamber in the transport direction of the substrates and the outer cylindrical surface of this diverting roller of the first belt conveyor is arranged so as to form a channel through which air can flow. At least one counter-nozzle is provided. The relevant counter-nozzle is arranged so as to blow air into the channel, which is formed by the wall of the last suction chamber in the transport direction of the substrates and the outer cylindrical surface of the diverting roller of the first belt conveyor, in the direction of the suction belt. The air that is blown into the channel emerges in the transport direction of the substrates in front of a tangency point that is formed by the suction belt at the diverting roller of the first belt conveyor, through the suction belt, and pushing against a substrate resting on the suction belt. An air current emerging from the at least one lifting nozzle of the guide device and the air current that is generated by the at least one counter-nozzle in the channel, and that passes through the suction belt is oriented so as to come together above the tangency point of the diverting roller of the first belt conveyor. These two air currents form a combined air current in an active region that extends shorter than the diameter of the diverting roller of the first belt conveyor, and the combined air current is oriented so as to exert a pressure that acts against at least a part of the bearing surface of this substrate between the suction belt and a substrate to be transported thereon.

The advantages achievable by the invention are, in particular, that sheet-format substrates can be transferred in a machine assembly for conveying these substrates from a first belt conveyor to a downstream second belt conveyor in an operationally safe manner, and thus devoid of disruptions, both in the case of a high transport speed of several thousand substrates per hour, for example in a range between 5,000 and 10,000 substrates per hour, and in the case of a small format, that is, in particular in the case of a short edge length of, for example, less than 300 mm in the transport direction of these substrates to be transported. Further advantages can be derived from the following description of the invention.

BRIEF DESCRIPTION OF THE DRAWINGS

An exemplary embodiment of the invention is illustrated in the drawings and will be described in greater detail below. The figures show.

DETAILED DESCRIPTION

Figure 1:
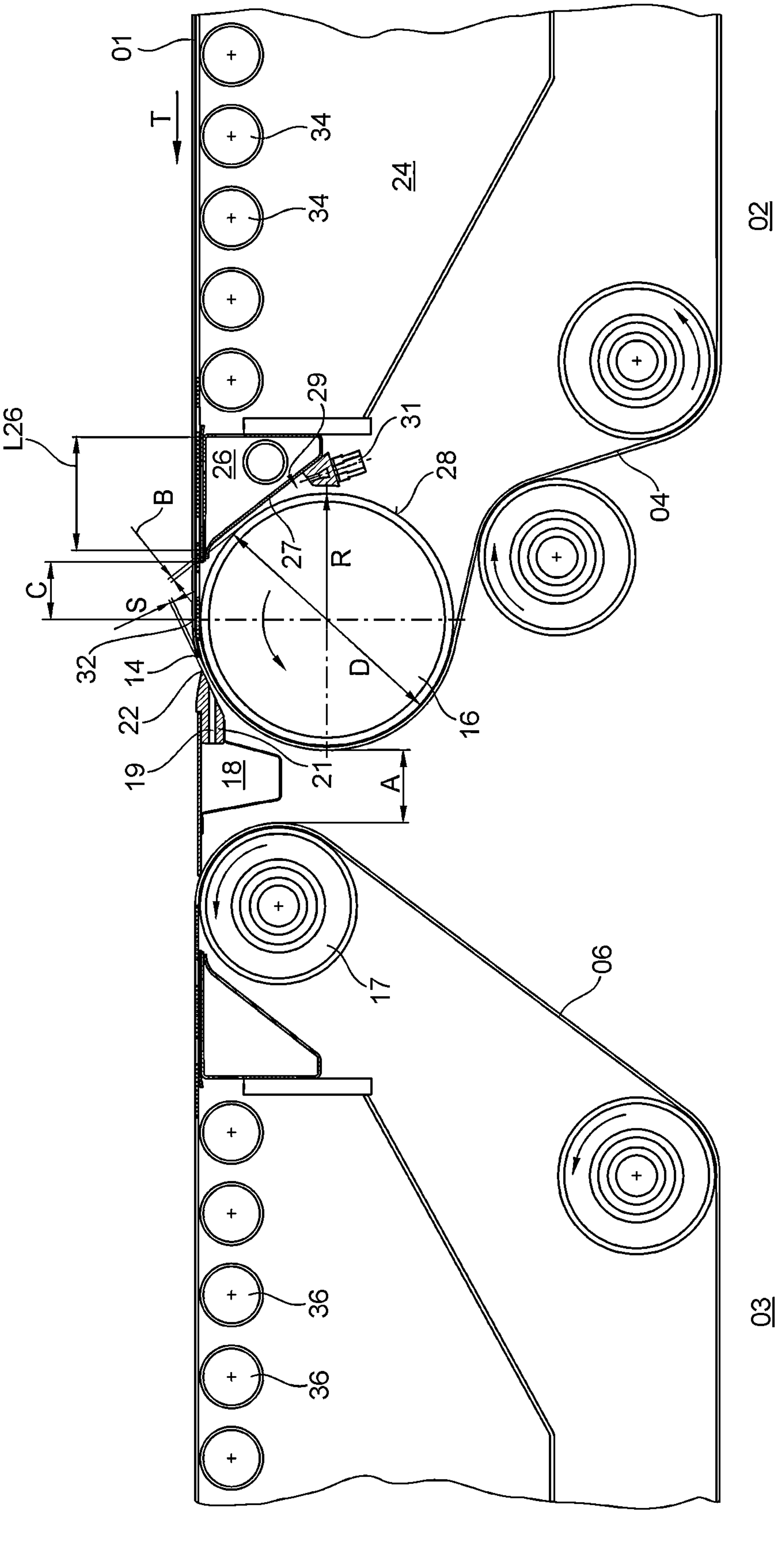
FIG. 1 a first sectional view of a machine assembly comprising a first belt conveyor and comprising a second belt conveyor, each for conveying sheet-format substrates.

FIG. 1 shows a sectional view of a machine assembly, shown in a simplified illustration, for conveying sheet-format substrates 01. This machine assembly comprises a first belt conveyor 02 and a second belt conveyor 03, wherein each of these two belt conveyors 02; 03, arranged adjacent to one another, comprises a continuously circulating transport belt 04; 06 and they are arranged one behind the other in the transport direction T of the substrates 01 that are in each case conveyed resting on the respective transport belt 04; 06.

Figure 2:
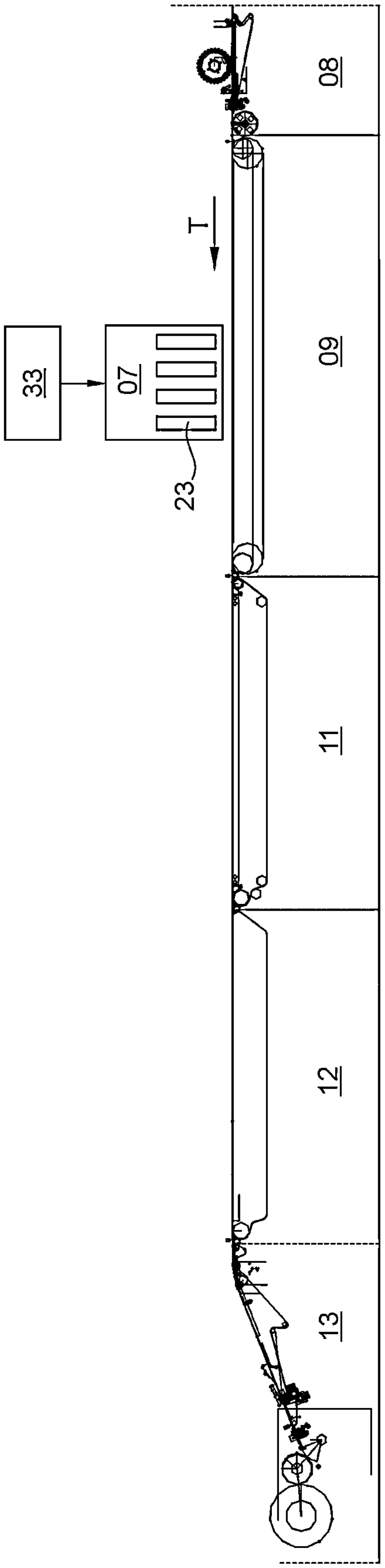
FIG. 2 a sectional view of a printing machine comprising the machine assembly according to FIG. 1.

As is shown by way of example in FIG. 2, such a machine assembly is, for example, an integral part of a printing machine printing the sheet-format substrates 01 in an industrial printing process by means of a non-impact printing device 07, wherein the non-impact printing device 07 is designed to print the sheet-format substrates 01, for example, in an ink jet printing process. The non-impact printing device 07, for example, comprises at least one, preferably multiple ink jet print heads 23. The ink jet print heads 23 controlled by a control unit 33 apply in particular a water-based ink to the relevant substrate 01 in accordance with a print image to be created.

Such a printing machine used in an industrial printing process generally comprises several consecutive machine units in the transport direction T of the substrates 01. At least one of these machine units is designed as a printing unit 09, at least one further machine unit is designed as a dryer 11 or as a cooling device 12, or first a dryer 11 and then a cooling device 12 are provided one behind the other. In particular, these aforementioned machine units, which are each preferably arranged in a dedicated machine frame and thus are each designed, for example, as a separate module, are connected to the machine assembly according to the invention for conveying sheet-format substrates 01 since they, in particular, utilize such a machine assembly. It may furthermore be provided in the described printing machine that a first infeed 08 individually and consecutively feeds sheet-format substrates 01 to be printed to the printing unit 09, wherein the printing unit 09 comprises the aforementioned non-impact printing device 07. In a preferred embodiment of the printing machine, directly subsequent to the printing unit 09, the printed substrates 01 are fed to the dryer 11, which is designed, for example, as a continuous-flow dryer, in particular as a hot air dryer, and, if needed, can comprise an infrared radiation device in addition to the hot air dryer. Since the substrates 01, when passing through the dryer 11, are heated at least partly to, for example, more than 80° C., a cooling section including a cooling device 12 can advantageously be provided directly subsequent to the dryer 11, which cools the printed and dried substrates 01 again to a temperature of, for example, less than 30° C. Thereafter, the substrates 01 can be transferred to a second infeed 13 or to a delivery so as to transport these substrates 01, for example, to a varnishing unit or to a mechanical post-processing device. The three aforementioned machine units, these being the printing unit 09, the dryer 11 and the cooling device 12, preferably transport the substrates 01 in a translatory manner, in particular by means of belt conveyors 02; 03, so that the machine assembly according to the invention for conveying sheet-format substrates 01 is formed, for example, at a transfer point between the printing unit 09 and the dryer 11 and/or at a transfer point between the dryer 11 and the cooling device 12 and/or at a transfer point between the cooling device 12 and the second infeed 13 or the delivery.

It has now been shown in practice that the transfer points mentioned above by way of example, with respect to the transport of the substrates 01, tend to be susceptible to disruptions, in particular at a high transport speed of several thousand substrates 01 per hour, since a forward edge 14 of the substrates 01, in the transport direction T, at times quite easily becomes entangled at or in the relevant transfer point, resulting in a disruption of the operation of the entire machine assembly along with an attendant interruption of the production process. Since a disruption of the operation caused in this way always requires some time before it is eliminated, this problem can lead to considerable economic losses, in particular when it is provided that the substrates 01 are to be conveyed in an industrial process at a transport speed of several thousand substrates 01 per hour, for example in the range between 5,000 and 10,000 substrates 01 per hour, because the entire production process is adapted to this transport speed, and consequently to this substrate throughput.

The substrates 01 to be conveyed by means of the machine assembly according to the invention are preferably rectangular and are made, for example, of paper or paperboard or cardboard. Paper, paperboard and cardboard differ in terms of the respective weight thereof, referred to as grammage, that is, the weight of these substrates in grams per square meter. The grammage of paper is between 30 $g/m^2$ and 150 $g/m^2$, that of paperboard is between 150 $g/m^2$ and 600 $g/m^2$, and that of cardboard is more than 600 $g/m^2$. However, the substrates 01 to be conveyed can also in each case be made of a plastic material and/or designed as a thin metal panel and/or as a composite composed, for example, of multiple layers, wherein these layers are made of different materials.

As can be derived from FIGS. 1 and 2, the tight run of the transport belt 04 of the first belt conveyor 02 arranged directly upstream from the second belt conveyor 03 and the tight run of the transport belt 06 of the second belt conveyor 03 are arranged in the same transport plane extending rectilinearly in the transport direction T of the substrates 01. Tight run denotes the part of the particular transport belt 04; 06 on which the particular substrate 01 to be transported rests while being transported. The transport belt 04 of the first belt conveyor 02 is diverted by at least 90° in relation to the transport plane at the rear end thereof, in the transport direction T of the substrates 01, at a preferably rotating diverting roller 16. The transport belt 06 of the second belt conveyor 03 is also diverted by at least 90° in relation to the transport plane, in the same direction as the transport belt 04 of the first belt conveyor 02, at the forward end thereof, in the transport direction T of the substrates 01, at a likewise preferably rotating diverting roller 17, which is arranged spaced a first distance A apart from the diverting roller 16 of the first belt conveyor 02. The respective direction of rotation of the respective diverting roller 16; 17, and thus the direction of revolution of the respective transport belt 04; 06, is indicated in each case by a rotational direction arrow in FIG. 1. In particular the diverting roller 16 of the first belt conveyor 02 is preferably designed as a belt conveyor roller driving the transport belt 04 of the first belt conveyor 02.

In a region between the diverting roller 16 of the first belt conveyor 02 and the diverting roller 17 of the second belt conveyor 03, the transport plane has a discontinuity point in the mechanical support of the substrates 01 to be transported. So as to have the substrates 01 to be transported slide across this discontinuity point, a guide device 18, which guides the substrates 01 to be transported, comprising at least one lifting nozzle 19 is arranged in this region of the discontinuity point between the diverting roller 16 of the first belt conveyor 02 and the diverting roller 17 of the second belt conveyor 03. The guide device 18 extends both in the transport direction T of the substrates 01 and transversely thereto and comprises a tapered profile element 21, preferably in the form of a squeegee, which extends transversely to the transport direction T of the substrates 01, wherein the at least one lifting nozzle 19 of the guide device 18 is arranged so as to open into the tip 22 of the profile element 21. Preferably, multiple lifting nozzles 19 that are arranged in at least one row are arranged in the tip 22 of the profile element 21 of the guide device 18. The tip 22 of this profile element 21 is oriented counter to the transport direction T of the substrates 01 at least approximately tangentially to the transport belt 04 of the first belt conveyor 02 and is arranged so as to be spaced apart by a first gap from the transport belt 04 that is diverted at the diverting roller 16 of the first belt conveyor 02. This first gap has a gap width S in the range between 1 mm and 5 mm, for example, wherein this gap width S is designed to be larger than the thickness d of the substrates 01.

At least the transport belt 04 of the first belt conveyor 02 is designed as a flat suction belt that has a perforation in the transport surface thereof, wherein the substrate 01 to be transported is held non-positively with the bearing surface thereof resting on the perforated transport surface of the suction belt. The force fit is achieved by a negative pressure exerting a suction force, wherein this negative pressure holding the substrate 01 to be transported on the suction belt is a negative pressure formed in relation to the barometric air pressure surrounding the machine assembly, wherein this negative pressure is generated by means of a suction device and, for example, also set in absolute terms. The suction device exerting the suction force at the transport belt 04 of the first belt conveyor 02 designed as a suction belt comprises at least one suction chamber 24 below the tight run of this transport belt 04. The tight run of the transport belt 04 designed as a suction belt is preferably supported by one or more supporting rolls 34 that each extend transversely to the transport direction T of the substrates 01, at least in the region of the relevant suction chamber 24. However, the tight run of the transport belt 06 of the second belt conveyor 03 can also be supported in each case at least in sections by one or more supporting rolls 36 that extend transversely to the transport direction T of the substrates 01. This is advantageous when the transport belt 06 of the second belt conveyor 03 is also designed as a suction belt and at least one suction chamber is arranged beneath the tight run of this transport belt 06. Supporting rolls 36 are then arranged in particular in the region of this suction chamber.

A wall 27 of a last suction chamber 26, in the transport direction T of the substrates 01, of the suction device belonging to the first belt conveyor 02 is arranged spaced a second distance B apart from the diverting roller 16 of this first belt conveyor 02 in the transport direction T of the substrates 01 directly upstream from this diverting roller 16. This second distance B is 1.5 mm to 3 mm, for example. The wall 27 of the last suction chamber 26, in the transport direction T of the substrates 01, of the suction device belonging to the first belt conveyor 02 is arranged, for example, obliquely to the transport plane that extends rectilinearly in the transport direction T of the substrates 01 or it forms, for example, an equidistant with respect to the outer cylindrical surface 28 of the diverting roller 16 of the first belt conveyor 02 over an arcuate section. In the configuration in which the wall 27 of the last suction chamber 26, in the transport direction T of the substrates 01, is arranged obliquely, that is, at an acute angle with respect to the transport plane that extends rectilinearly in the transport direction T of the substrates 01, this angle is open counter to the transport direction T of the substrates 01.

In a preferred embodiment, a higher negative pressure, in absolute terms, is applied to the last suction chamber 26 in the transport direction T of the substrates 01 compared to the at least one suction chamber 24 that is arranged upstream from this last suction chamber 26. The negative pressure in the last suction chamber 26 in the transport direction T of the substrates 01 is set, for example, to 6,000 Pa, while the negative pressure in the at least one other upstream suction chamber 24 is set, for example, to 600 Pa. The negative pressure in the last suction chamber 26 in the transport direction T of the substrates 01 can thus be set, for example, ten times higher in absolute terms than in the at least one other upstream suction chamber 24. In a preferred embodiment, the last suction chamber 26 in the transport direction T of the substrates 01 extends over a length L26 of no more than 100 mm in the transport direction T of the substrates 01, while the at least one other upstream suction chamber 24 can have a length of more than 1,000 mm in the transport direction T of the substrates 01. The wall 27 of the last suction chamber 26 in the transport direction T of the substrates 01 and the outer cylindrical surface 28 of this diverting roller 16 of the first belt conveyor 02 are arranged so as to form a channel 29 through which air can flow.

Furthermore, at least one counter-nozzle 31 is provided, wherein the relevant counter-nozzle 31 is arranged so as to blow air into the channel 29, which is formed by the wall 27 of the last suction chamber 26 in the transport direction T of the substrates 01 and the outer cylindrical surface 28 of the diverting roller 16 of the first belt conveyor 02, in the direction of the suction belt. It is provided that the air that is blown into the channel 29 emerges in the transport direction T of the substrates 01 in front of a tangency point 32 that is formed by the suction belt at the diverting roller 16 of the first belt conveyor 02, through the suction belt, and pushing against a substrate 01 resting on the suction belt. This emergence of air preferably takes place directly in front of this tangency point 32 or at least spaced a third distance C apart from this tangency point 32, wherein this third distance C is smaller than the radius R of the relevant diverting roller 16 of the first belt conveyor 02. An air current emerging from the at least one lifting nozzle 19 of the guide device 18 and the air current that is generated by the at least one counter-nozzle 31 in the channel 29 and that passes through the suction belt are oriented so as to preferably come together frontally above the tangency point 32 of the diverting roller 16 of the first belt conveyor 02. These two air currents form a combined air current in an active region W that extends above the tangency point 32 of the diverting roller 16 of the first belt conveyor 02 shorter than the diameter D of the diverting roller 16 of the first belt conveyor 02 along the outer cylindrical surface 28 of this diverting roller 16. This combined air current exerts a pressure that acts against at least a part of the bearing surface of this substrate 01 between the suction belt and a substrate 01 to be transported thereon, whereby this combined air current in particular lifts the forward edge 14 of the substrate 01 to be transported off the transport surface of the transport belt 04 of the first belt conveyor 02 which is designed as a suction belt. During the further transport, the entire substrate 01 is ultimately lifted onto the guide device 18, and thus across the discontinuity point in the mechanical support and is fed in the transport plane to the transport belt 06 of the second belt conveyor 03 in an operationally safe manner.

Figure 3:
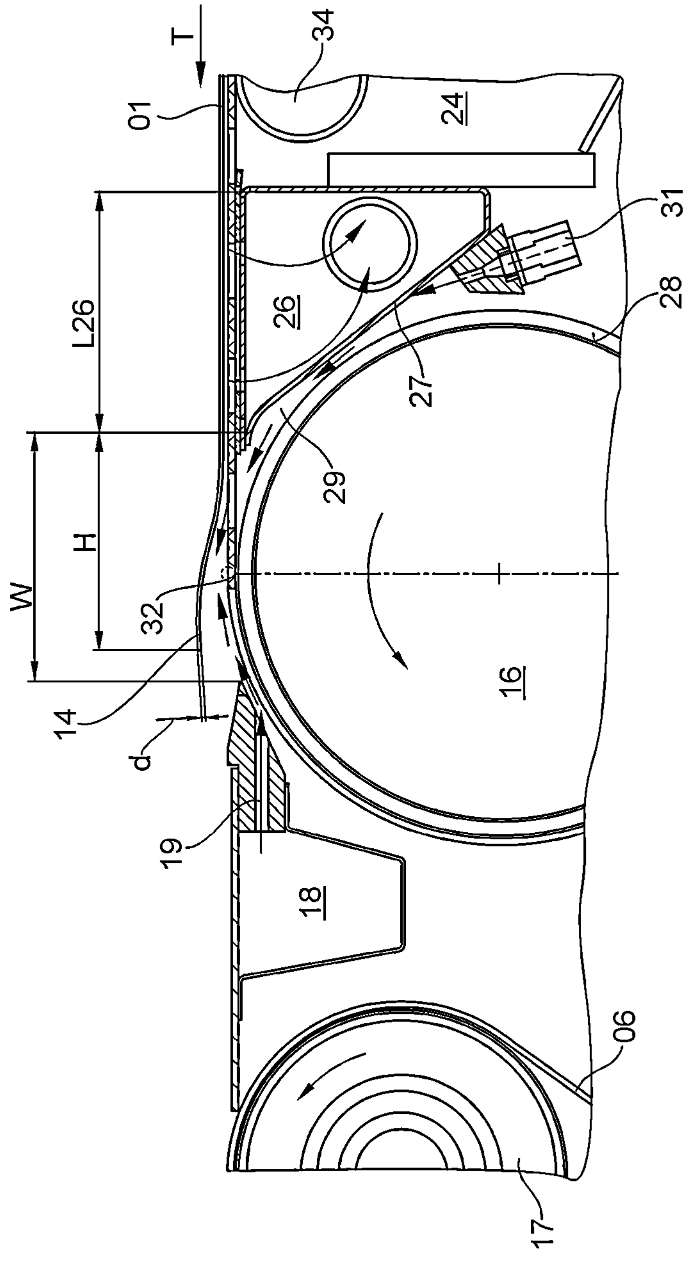
FIG. 3 a second sectional view of the machine assembly according to FIG. 1 to illustrate its mechanism of action.

FIG. 3 now also shows a second sectional view of the machine assembly according to FIG. 1 to illustrate its mechanism of action. A substrate 01 that is being transported, lying flat, in the transport direction T by the transport belt 04 of the first belt conveyor 02, which is designed as a suction belt, is initially held non-positively at the contact surface thereof on the suction belt by a negative pressure generated by the at least one suction chamber 24 and, during the further course of the transport, by a negative pressure generated by the last suction chamber 26, wherein the negative pressure generated by the last suction chamber 26 is indicated in FIG. 3 by two directional arrows and, for example, is set to be ten times stronger than the negative pressure generated by the at least one suction chamber 24 arranged upstream in the transport direction T of the substrates 01. After, during the further course of the transport in the transport direction T, the forward edge 14 of the relevant substrate 01 has passed the active region of the last suction chamber 26 determined by the length L26, this forward edge 14 of the relevant substrate 01 reaches the active region W in which the air current generated by the at least one lifting nozzle 19 of the guide device 18 and the air current generated by the at least one counter-nozzle 31 in the channel 29 and passing through the suction belt form a combined air current. These two air currents are oriented in opposite directions, as is indicated in each case by directional arrows in FIG. 3, and come together above the tangency point 32 of the diverting roller 16 of the first belt conveyor 02. In the absence of other outflow options, these two air currents are combined to form a combined air current that is directed against the bearing surface of the transported substrate 01, wherein this combined air current exerts a pressure against the bearing surface of the transported substrate 01. As is shown in FIG. 3, this pressure is initially exerted against the forward edge 14 of the relevant substrate 01. During the further course of the transport, the entire bearing surface of the transported substrates 01 is thus lifted off the suction belt of the first belt conveyor 02 in this manner. The spatial area in which this lift-off occurs is referred to as the lifting region H, wherein this lifting region H is arranged within the active region W of the combined air current.

As a result of the proposed solution, on the one hand, a substrate 01 to be transported is held reliably with the bearing surface thereof on the suction belt of the first belt conveyor 02 and, on the other hand, the relevant substrate 01 is also guided without disruptions across the discontinuity point formed between the two belt conveyors 02; 03. That's because, due to the negative pressure of the last suction chamber 26 being set to be stronger compared to the negative pressure of the at least one upstream suction chamber 24, the substrate 01 to be transported is fixed until the lifting region H is reached. Since the last suction chamber 26, in the transport direction T, of the first belt conveyor 02 with the negative pressure, which is generated by the suction chamber and non-positively holds the substrate 01 to be transported, extends within a third distance C, which is smaller than the radius R of the relevant diverting roller 16 of the first belt conveyor 02, and thus very close to the tangency point 32 of the diverting roller 16 of the first belt conveyor 02, and this last suction chamber 26 additionally only extends over a short length L26, compared to the upstream suction chamber 24, of preferably no more than 100 mm, the substrate 01 to be transported remains reliably fixed up until a very short distance from the tangency point 32 of the diverting roller 16 of the first belt conveyor 02, which is in particular advantageous for substrates 01 that have a comparatively short length in the transport direction T thereof. The combined air current formed as a result of the combination of the air current that is generated by the at least one lifting nozzle 19 of the guide device 18 and the air current that is generated by the at least one counter nozzle 31 in the channel 29 and passes through the suction belt is so powerful in the lifting region H that a bending moment lifting the relevant substrate 01 off the suction belt is exerted, first on the forward edge 14 of the transported substrate 01, which is fixed on the suction belt by the negative pressure of the last suction chamber 26 and then, during the further course of the transport, on the entire bearing surface of the substrate 01 to be transported. This reliably prevents the forward edge 14 of the relevant transported substrate 01 from becoming entangled at or in the discontinuity point formed between the two belt conveyors 02; 03, that is, at the relevant transfer point, so that a disruption of the operation for the entire machine assembly, which is caused by the entanglement, along with an attendant disruption of the production process can be reliably avoided.

The identified solution thus has the advantage that the substrate 01 to be transported can be transferred both in the case of a high transport speed of several thousand substrates 01 per hour, for example in a range between 5,000 and 10,000 substrates 01 per hour, and in the case of a very short substrate format having an edge length of, for example, less than 300 mm in the transport direction T from a first belt conveyor 02 to a downstream second belt conveyor 03 in an operationally safe manner, and thus devoid of disruptions.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A machine assembly for conveying sheet-format substrates (01), comprising a first belt conveyor (02) and a second belt conveyor (03), these belt conveyors (02; 03) each having a continuously circulating transport belt (04; 06) and being arranged one after the other in the transport direction (T) of the substrates (01) conveyed on the respective transport belt (04; 06); the transport belt (04) of the first belt conveyor (02) and the transport belt (06) of the second belt conveyor (03) being arranged in the same transport plane extending rectilinearly in the transport direction (T) of the substrates (01); the transport belt (04) of the first belt conveyor (02) being diverted by at least 90° in relation to the transport plane at the rear end thereof, in the transport direction (T) of the substrates (01), at a diverting roller (16) and the transport belt (06) of the second belt conveyor (03) likewise being diverted by at least 90° in relation to the transport plane, in the same direction as the transport belt (04) of the first belt conveyor (02), at the forward end thereof, in the transport direction (T) of the substrates (01), at a diverting roller (17), which is arranged spaced a first distance (A) apart from the diverting roller (16) of the first belt conveyor (02); in a region between the diverting roller (16) of the first belt conveyor (02) and the diverting roller (17) of the second belt conveyor (03), the transport plane having a discontinuity point in the mechanical support of the substrates (01) to be transported; a guide device (18), which extends transversely to the transport direction (T) of the substrates (01) and guides the substrates (01) to be transported and comprises at least one lifting nozzle (19), being arranged in this region of the discontinuity point between the diverting roller (16) of the first belt conveyor (02) and the diverting roller (17) of the second belt conveyor (03); the guide device (18) comprising a tapered profile element (21), which extends transversely to the transport direction (T) of the substrates (01); the at least one lifting nozzle (19) of the guide device (18) being arranged so as to open into the tip (22) of the profile element (21); the tip (22) of this profile element (21) being oriented counter to the transport direction (T) of the substrates (01) toward the transport belt (04) of the first belt conveyor (02) and being arranged so as to be spaced apart by a first gap from the transport belt (04) that is diverted at the diverting roller (16) of the first belt conveyor (02); at least the transport belt (04) of the first belt conveyor (02) being designed as a suction belt that non-positively holds the relevant substrate (01) resting thereon with the bearing surface thereof; the suction force being achieved by a negative pressure that is set in relation to the ambient barometric air pressure by means of a suction device; the suction device implementing the suction force at the suction belt of the first belt conveyor (02) comprising at least one suction chamber (24); a wall (27) of a last suction chamber (26), in the transport direction (T) of the substrates (01), of the suction device being arranged spaced a second distance (B) apart from the diverting roller (16) of the first belt conveyor (02) in the transport direction (T) of the substrates (01) directly upstream from this diverting roller (16); the wall (27) of the last suction chamber (26) in the transport direction (T) of the substrates (01) and the outer cylindrical surface (28) of this diverting roller (16) of the first belt conveyor (02) being arranged so as to form a channel (29) through which air can flow; at least one counter-nozzle (31) being provided; the relevant counter-nozzle (31) being arranged so as to blow air into the channel (29), which is formed by the wall (27) of the last suction chamber (26) in the transport direction (T) of the substrates (01) and the outer cylindrical surface (28) of the diverting roller (16) of the first belt conveyor (02), in the direction of the suction belt; it being provided that the air that is blown into the channel (29) emerges in the transport direction (T) of the substrates (01) in front of a tangency point (32) that is formed by the suction belt at the diverting roller (16) of the first belt conveyor (02), through the suction belt, and pushing against a substrate (01) resting on the suction belt; an air current emerging from the at least one lifting nozzle (19) of the guide device (18) and the air current that is generated by the at least one counter-nozzle (31) in the channel (29) and that passes through the suction belt being oriented so as to come together above the tangency point (32) of the diverting roller (16) of the first belt conveyor (02); these two air currents forming a combined air current in an active region (W) that extends shorter than the diameter (D) of the diverting roller (16) of the first belt conveyor (02); and the combined air current being oriented so as to exert a pressure that acts against at least a part of the bearing surface of this substrate (01) between the suction belt and a substrate (01) to be transported thereon.

2. The machine assembly according to claim 1, characterized in that the diverting roller (16) of the first belt conveyor (02) is designed as a belt conveyor roller driving the transport belt (04) of the first belt conveyor (02).

3. The machine assembly according to claim 1, characterized in that the tight run of the transport belt (04) of the first belt conveyor (02) which is designed as a suction belt is supported by one or more supporting rolls (34) that each extend transversely to the transport direction (T) of the substrates (01), at least in the region of the suction chamber (24) implementing the suction force at this suction belt.

4. The machine assembly according to claim 1, characterized in that the first gap between the tip (22) of the profile element (21) of the guide device (18) and the transport belt (04) diverted at the diverting roller (16) of the first belt conveyor (02) has a gap width(S) in the range between 1 mm and 5 mm.

5. The machine assembly according to claim 1, characterized in that the tip (22) of the profile element (21) of the guide device (18) is oriented tangentially to the transport belt (04) of the first belt conveyor (02).

6. The machine assembly according to claim 1, characterized in that a higher negative pressure, in absolute terms, is applied to the last suction chamber (26) in the transport direction (T) of the substrates (01) compared to the at least one suction chamber (24) that is arranged upstream from this last suction chamber (26).

7. The machine assembly according to claim 1, characterized in that the last suction chamber (26), in the transport direction (T) of the substrates (01), is designed to be shorter in the transport direction (T) of the substrates (01) than the at least one suction chamber (24) arranged upstream from this last suction chamber (26).

8. The machine assembly according to claim 1, characterized in that the last suction chamber (26), in the transport direction (T) of the substrates (01), has a length (L26) of no more than 100 mm in the transport direction (T) of the substrates (01).

9. The machine assembly according to claim 1, characterized in that the wall (27) of the last suction chamber (26), in the transport direction (T) of the substrates (01), of the suction device belonging to the first belt conveyor (02) is arranged obliquely to the transport plane that extends rectilinearly in the transport direction (T) of the substrates (01) and/or forms an equidistant with respect to the outer cylindrical surface (28) of the diverting roller (16) of the first belt conveyor (02) over an arcuate section.

10. The machine assembly according to claim 1, characterized in that a spatial area, in which the combined air current between the suction belt of the first belt conveyor (02) and a substrate (01) to be transported thereon exerts a pressure that acts against at least a part of the bearing surface of this substrate (01), forms a lifting area (H), this lifting area (H) being arranged within the active region (W) of the combined air current.

11. A printing machine, comprising a machine assembly according to claim 1, a plurality of machine units being arranged one behind the other in the transport direction (T) of the substrates (01); at least one of these machine units being designed as a printing unit (09) and at least one further machine unit being designed as a dryer (11) or as a cooling device (12); these machine units designed as a printing unit (09) or as a dryer (11) or as a cooling device (12) each being arranged in a dedicated machine frame; each of these machine units being designed so as to transport the substrates (01) by means of one of the belt conveyors (02; 03); and the discontinuity point in the mechanical support of the substrates (01) to be transported between the respective first belt conveyor (02) and the respective second belt conveyor (03) in each case being designed at a transfer point between the printing unit (09) and the dryer (11) and/or at a transfer point between the dryer (11) and the cooling device (12) and/or at a transfer point between the cooling device (12) and an infeed (13) arranged downstream from this cooling device (12).

12. The printing machine according to claim 11, characterized in that the printing unit (09) comprises a non-impact printing device (07) printing the substrates (01) in an ink jet printing process, the relevant non-impact printing device (07) in each case comprising at least one ink jet print head (23) controlled by a control unit (33).

13. The printing machine according to claim 11, characterized in that the dryer (11) is designed as a continuous-flow dryer, and the dryer (11) being designed as a hot air dryer.

* * * * *